Dec. 11, 1934.　　　G. MUELLER　　　1,983,767
SPARE TIRE AND WHEEL CARRIER
Filed Dec. 21, 1931　　　2 Sheets-Sheet 2
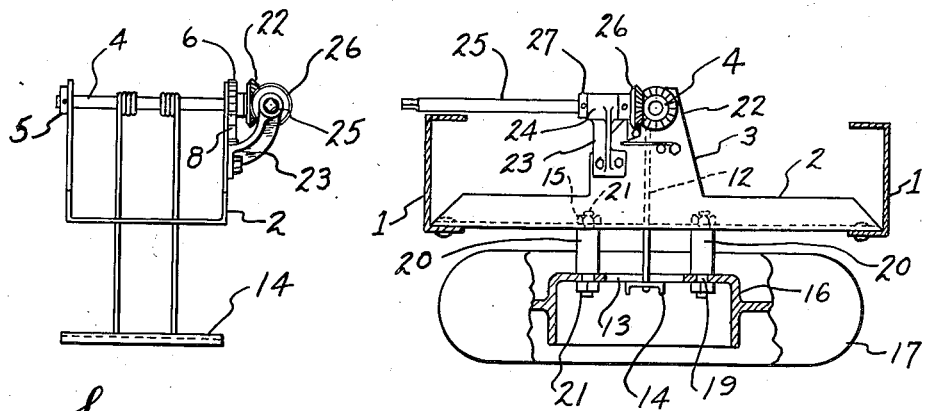
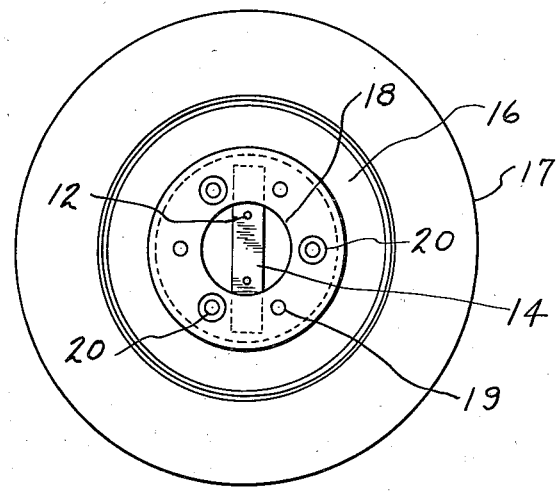
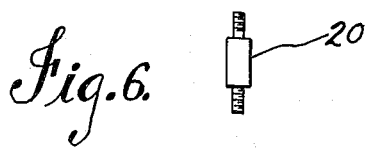
INVENTOR.
George Mueller
BY
ATTORNEYS.

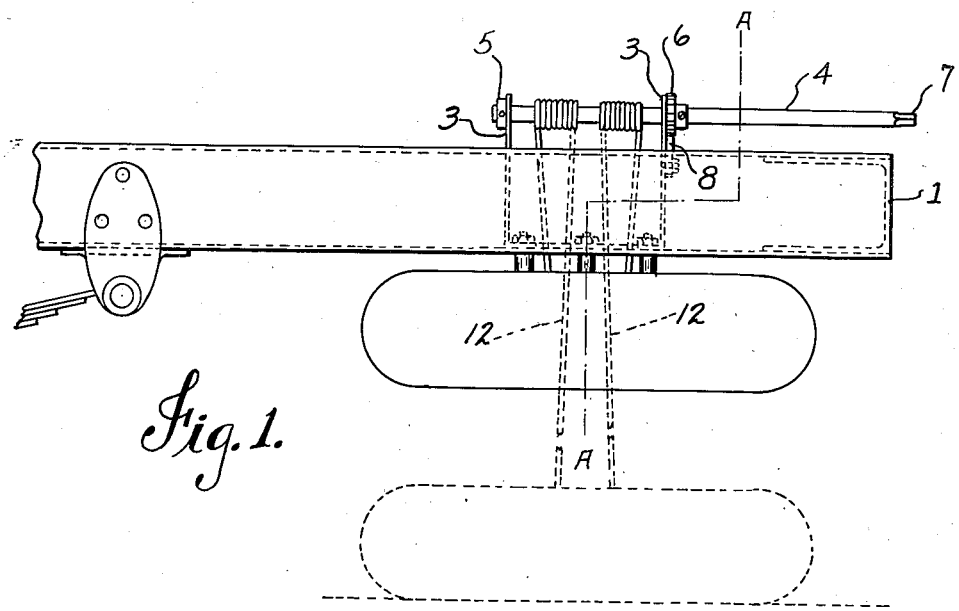
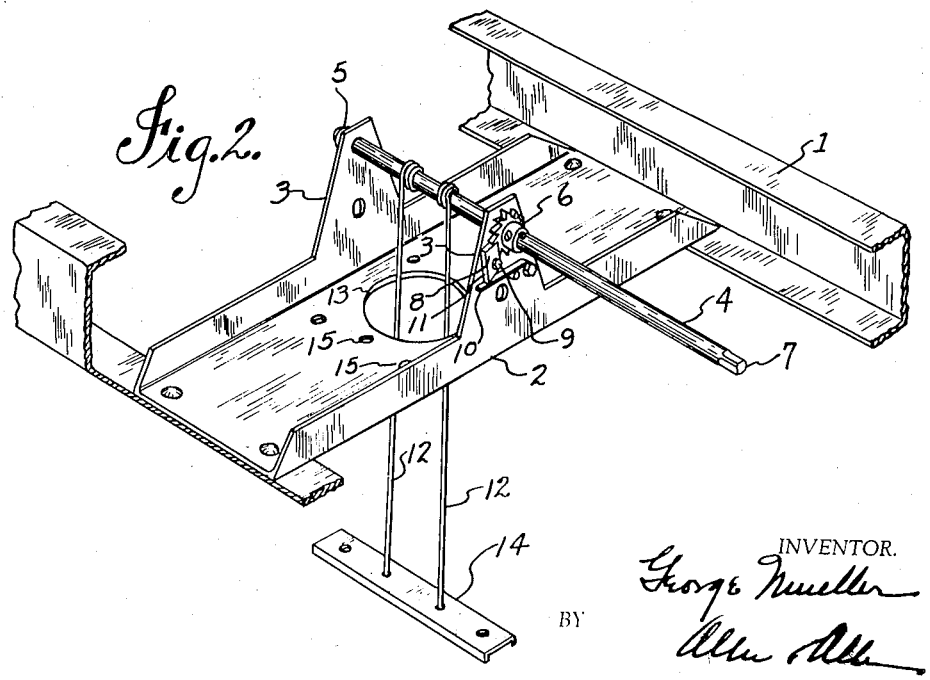

Patented Dec. 11, 1934

1,983,767

UNITED STATES PATENT OFFICE 1,983,767

SPARE TIRE AND WHEEL CARRIER

George Mueller, Cincinnati, Ohio, assignor to The Le Blond-Schacht Truck Co., Cincinnati, Ohio, a corporation of Ohio Application December 21, 1931, Serial No. 582,259

2 Claims. (Cl. 224—29)

My invention relates to tire and wheel carriers particularly for heavy tires and wheels for large automotive vehicles.

Present day transportation requirements have caused a rapid increase in the size and weight of the tires and wheels used on heavy trucks. The tires and wheels are very difficult to handle to and from their storage compartment which is usually found underneath the rear of the chassis frame, unless the spare equipment is carried on the forward side of the chassis. Heretofore, there has usually been provided either a closed box-like compartment or the chassis has had several U shaped cross bars secured between side frame members forming an open pocket or compartment beneath the chassis in which the spare wheel equipment is stored. These compartments are well forward of the rear end of the truck frame and are reasonably high off the ground, so that it has been difficult to handle the spare equipment when required and difficult to replace after changes have been made. It is not uncommon for these tires and wheels to weigh from 250 to 350 pounds each, and in certain cases even more, thus making it impossible for one man to handle, and the larger sizes frequently take three men to place in the compartment.

It is the purpose of my invention to provide equipment which will make it possible for one man to remove and replace any one of the various sizes of spare wheels and tires with ease and facility.

Referring to the drawings:—

Figure 1 is an elevation of the rear end of a truck frame with a spare tire secured in carrying position, the position in which the tire was originally placed being shown in dotted lines.

Figure 2 is a perspective view of my preferred type of spare wheel handling winch, parts of the supporting frame being shown broken away.

Figure 3 is a plan view of a spare wheel and tire.

Figure 4 is an elevation of a modified form of my winch, parts of the view being in transverse section on line A—A of Figure 1.

Figure 5 is an end elevation of the winch shown in Figure 4.

Figure 6 is an elevation of one of the tire securing spacer studs.

The rear end of a truck chassis has sides of the usual channel iron cross section with top and bottom flanges.

Secured transversely between the two frame side members 1 and resting on the lower flanges thereof is a base plate 2, this base plate being of a wide channel-like structure, having at its mid portion, upstanding bearing members 3. Mounted in the bearing members 3, is a winder shaft 4. This shaft is secured against endwise movement in one direction by a collar 5 and in the other direction by a ratchet wheel 6, which is keyed to it, the outer end of the shaft being squared as shown at 7 for the reception of a wrench for turning. The shaft 4 is restrained from turning in one direction by a pawl 8, which engages the ratchet wheel 6. The pawl is pivoted as shown at 9 and has a spring 10, bearing against one of its lower corners.

The pawl may be disengaged from the ratchet gear 6 by turning it counterclockwise away from the gear 6, until the spring bears against the edge 11 of the pawl, which then is held disengaged until restored manually to engagement with the ratchet gear 6.

Secured to the shaft 4, between the bearing members 3 is a pair of wire cables 12, these cables having a length in excess of that necessary to reach from their position on the shaft to the ground upon which the vehicle may be standing. These cables or ropes pass through a hole 13 in the base plate 2 and have secured to their ends a bar 14.

The base plate 2 has surrounding the central opening 13 a series of holes 15, these holes being arranged in different radial distances from the center of the hole 13 for reasons which will be hereinafter explained.

The usual truck or bus wheel has a central disc portion 16, on which is mounted a tire or shoe 17. The disc portion of the wheel has a large central hole 18 for the passage of the axle hub and a series of smaller holes 19 for reception of the mounting studs of the driving axle disc. These holes vary in radial distance in various size disc wheels.

In the appropriate holes 15 in the base plate 2 is mounted a series of spacer studs 20, these spacer studs 20 being secured by nuts 21 to the base plate 2, there being in the particular example illustrated, a series of three of these spacer studs 20, the spacing of these three studs corresponding to three of the holes 19 in the disc member 16 (Fig. 3).

Figure 1 shows a wheel assembly secured under the rear portion of a truck chassis. In Figure 4 it should be noted that the studs 20, which have their upper ends secured to the base plate 2, also have their lower ends passing through certain of the holes 19 in the disc 16 of the wheel assembly and are secured to the disc by appropriate nuts. A spare wheel assembly is thus held securely to the base plate 2 and is carried thereby until needed.

When for any reason, it is desired to use this spare wheel assembly, the operator may release the wheel assembly from base plate 2 by removing the nuts 21 on the studs 20. The wheel will then be held only by the bar 14, which bridges the opening 18 in the wheel assembly, and the bar is, of course, secured to the ropes 12 which are wound on the shaft 4 which is held from turning by the ratchet pawl 8.

Having freed the wheel assembly from the holding studs 20, the operator now releases the pawl 8 from the ratchet wheel 6 and by means of a handle or wrench on the squared end 7 of the shaft 4, lowers the wheel assembly to the ground. He continues to turn the shaft 4 until slack in the ropes 12 enables him to tip the bar 14 and retract it from the hole 18 in the wheel assembly, thus completely freeing the wheel assembly, whereupon it may be, as in the event of a puncture of one of the wheel assemblies on the truck, be mounted in on the axle in its place, the defective wheel assembly being then placed on the ground under the rear of the truck in a position to be raised and bolted to the base plate 2.

This is accomplished by the operator passing the bar 14 through the hole 18 in the defective wheel assembly until the bar bridges the hole 18, then restoring the pawl 8 to engage ratchet wheel 6 on the shaft 4, and then turning the shaft 4 and winding the ropes 12 thereon, thus raising the wheel assembly until it engages the spacer studs 20. The nuts 21 are then restored on the studs 20, thus again securing the wheel assembly to the base plate 2 in carrying position. The ropes 12 may be slackened so there is no strain on them since the studs 20 are the carrying means.

On a truck equipped with my mechanism, a single vehicle operator may easily remove and replace a spare tire and wheel from and to its storage compartment regardless of its weight.

On some vehicles it may not be practical to have the shaft 4 extend towards the rear end of the chassis frame member, in which event, I have provided means whereby the shaft 4 may be extended to either side of the chassis frame. Such an arrangement is shown in Figs. 4 and 5.

All of the front members are the same except that shaft 4 is shortened and there is mounted next to the ratchet wheel 6, on the shaft 4, a bevel gear 22, keyed to the shaft. Mounted by bolts on the bearing member 3 is a bracket 23, having a bearing 24, at its upper end in which is mounted at right angles to the shaft 4, a shaft 25. Keyed to the shaft 25 on the end toward the shaft 4 is a bevel gear 26 which meshes with the bevel gear 22 on the shaft 4. The shaft 25 extends to and beyond the frame side member 1 and its outer end rests on the top of the frame 1. A collar 27 is secured to the shaft 25 next to the bearing 24, and with the bevel gear 26 takes the thrust of the shaft. The end of the shaft 25 is squared for the application of a wrench.

It is obvious that the side extending mechanism operates any spare wheel handling device in the same manner as does the rearwardly extending straight shaft 4.

Having fully described the operation and advantages of my spare wheel handling device, what I desire to secure by Letters Patent is set forth in the following claims:

1. In combination with an automotive vehicle chassis, a support mounted on said chassis, having an aperture and spaced holes adjacent the edges of said aperture, elevating means mounted on said support and comprising a member movable up and down through said aperture and means on the lower part of said member to liftingly engage with a central part of a wheel, and means engaging respective holes of the support and with respective central portions of the wheel, to support the wheel when the wheel has been lifted into elevated position.

2. In combination with an automotive vehicle chassis, a support mounted on said chassis having a substantially flat underside close to the plane of the undersides of the chassis frame members, elevating means mounted on said support and comprising a member movable up and down below said support and means on the lower part of said member to liftingly engage with a central part of a wheel, said support having on its under side means to retentively engage in an aperture of the wheel near the center of the wheel and of relatively short vertical extent to hold the wheel when the wheel has been lifted into elevated position close to the under side of the support.

GEORGE MUELLER.